L. A. Aspinwall. Machine for Husking Corn.

Re-issue of Patent granted April 12. 1870,
Reissued Aug. 16. 1870. and Nov 8th 1870.

REISSUED MAY 23 1871

4388

Witnesses.

Chas. H. Smith
Jas. A. Walker

L. A. Aspinwall
Lemuel W. Serrell
Atty.

UNITED STATES PATENT OFFICE.

L. AUGUSTUS ASPINWALL, OF ALBANY, NEW YORK.

IMPROVEMENT IN MACHINES FOR HUSKING CORN.

Specification forming part of Letters Patent No. 101,809, dated April 12, 1870; Reissue No. 4,099, dated August 16, 1870; Reissue No. 4,174, dated November 8, 1870; Reissue No. 4,388, dated May 23, 1871.

*To all whom it may concern:*

Be it known that I, L. AUGUSTUS ASPINWALL, of the city and county of Albany, and State of New York, have invented certain new and useful Improvements in Corn-Huskers; and I declare the following specification, with the drawings forming a part thereof, to be a full and complete description of my invention.

Figure 1:
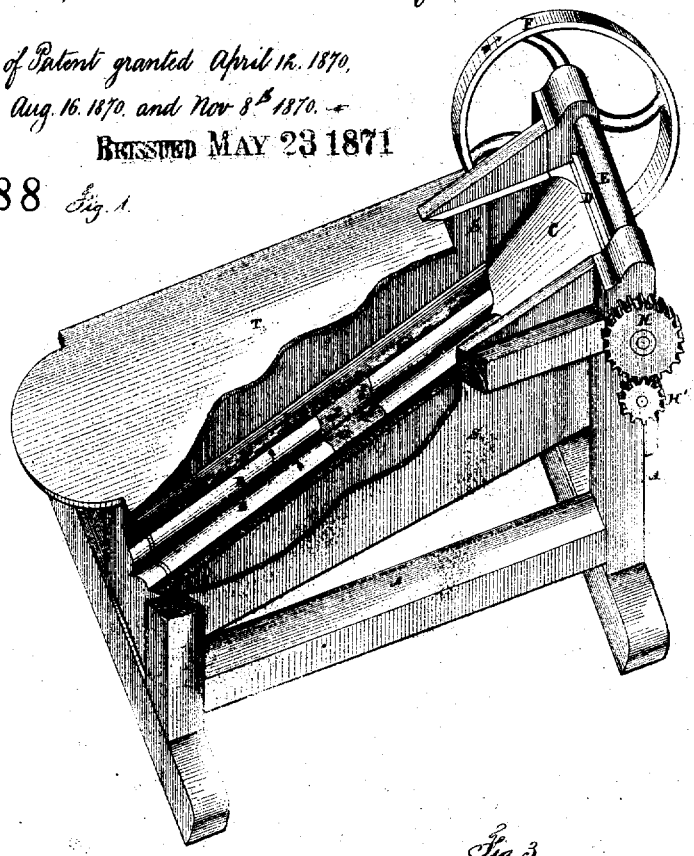
Figure 2:
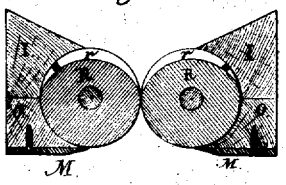
Figure 3:
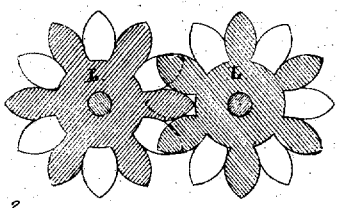
Figure 4:
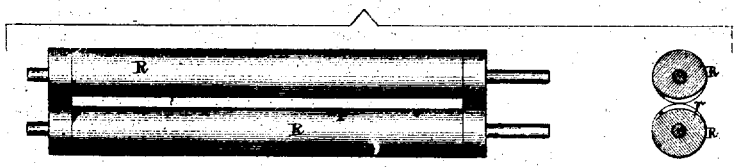

Figure 1 represents a perspective view of the machine with a portion of the top and side broken away. Fig. 2 represents a cross-section of the husking-rolls and cutters. Fig. 3 represents a section of the gear-wheels used upon the rolls. Fig. 4 represents a plan view of the rolls, modified as hereinafter described.

A A A is the frame of the machine.

T is the top or table.

F is the band-wheel, upon the shaft of which is the picker-roller D, having in its surface angular grooves. Above this, and in combination with it, is the plain roller E. These serve to pick or remove the ears of corn from the stalk.

Upon the shaft E is the gear-wheel H, connecting with the pinion H′, which gives motion to the husking-rolls R R by means of bevel-gears underneath. (Not shown in the drawings.) The husking-rollers R R are placed upon an incline, as in most machines, and their shafts are supported in boxes.

C is the inclined plane upon which the ears are conducted from the picking to the husking rollers. Beneath this is another pair of boxes which support the upper ends of the rolls; also, a pair of double gears which connects the rolls, similar to those shown in Fig. 3, L L.

S S are the sides of the machine.

I I are the inclined sides to direct the ears between the rolls.

Fig. 2 is a section of the rolls R R and the stationary cutters M M for the purpose of keeping the rolls free from husks.

Machines for husking corn have before been made with a pair of picking-rollers to pinch off the ear; also with inclined husking-rollers. These husking-rollers have been made of metal and also of rubber; but in practice it is found that the husks will frequently be caught between the rollers and draw the ear up endwise, and in this position it may remain, and the husks will either not be pulled off or else the ear will be injured or the corn shelled. In other instances the husks become more or less crossed above the ear, and, being simultaneously drawn by the rollers from opposite sides, pull the ear down in such a manner as to injure or shell the corn. To prevent these contingencies it is necessary that the rollers relieve their hold, so as to allow the rollers to take a fresh hold of the husk in a different position. The fluted rollers and grooves, both spiral and straight, heretofore employed have not been for relieving the hold on the husk, but for catching the projecting ends of the husk and nipping them more firmly. I make my husking-rollers with depressions that loosen the hold on the husk once or more each revolution. These rolls, when in rotation, will present between them alternately an open space and a closed contact of surfaces. The open space caused by the depressions is for the purpose of allowing the ear of corn to drop down into it, and in closing to suddenly impinge upon the covering or husk to detach a portion of it and carry it downward between the cylindrical surfaces as they roll together, and thus draw it off.

Experience has shown that the husking-rollers should be of small diameter, in order that the ear may not be caught between them and compressed, and thereby injure or shell the corn, for it will be apparent that the husking-rollers might be so large as to seize the ear and break it in pieces. In my husking-rollers these two principles are embodied. The depressed or eccentric surface at *r* is less convex than the other portions of the roller, because it is partially flattened, or a section of a cylinder of larger diameter than the rest of this roller. Therefore when the ear is exposed to the action of this part of the roller the husk is more powerfully compressed by the moving surface to loosen the same, and if the ear were held down by pulling on the husk at this time it might be injured; but when the ear is exposed to this action there is an opening between the rollers; hence the husk is not pulled, and as the surfaces of the rollers come together and impinge upon the husk the surfaces of the rollers come beneath the ear, and, being of a smaller diameter and greater convexity, no longer tend to nip the ear, but only to support it; hence the husk is pulled off without injury to the corn or the risk of shelling it. This alternate dropping and then seizhusk is pulled off without injury to the corn or the risk of shelling it. This alternate dropping and then seizing or impinging upon the husk and pulling it detaches the husk with great rapidity and certainty, and this operation is performed by husking-rollers that have one or more depressions of the necessary width, regardless of the shape of that depression; but it is to be borne in mind that the depression must not be concave, or it will be liable to catch the ear, compress it, and carry the same through the opening between the rollers. These depressed rolls are provided with teeth P P, set in one side of the depression, so as not to impinge upon the ear until the cylindrical surfaces pass their points of contact and let go their hold of the husk, thus preventing the shelling of the corn.

The pins or teeth at P aid in loosening the husks and carrying them down, so that the cylindrical portions of the rollers shall nip and pull them off.

I prefer rollers of small diameter, with only one depression on the periphery; but they may be made larger and have more. As long as they present the alternation of open spaces between them and the rolling contact of cylindrical surfaces, they will work in the aforesaid manner.

The depressions may, if made deeper, be all in one roll, and the other roll be made cylindrical, yet operate in the same manner.

Husking-rollers provided with teeth are liable to become wound around with husks that cannot be removed with scrapers. It is therefore necessary to use cutters, as seen in Fig. 2, M M.

The gear-wheels used upon the husking-rolls of all machines must necessarily be small; consequently are subject to a heavy strain, and are liable to break quite often. To avoid this the gears L L, Fig. 3, are used, which are double, and may be tripled or quadrupled, having teeth opposite the spaces in each, which gives a constant bearing upon the pitch-line, and insures a stronger wheel, from the fact of their being double the number of teeth. Although this is not new in itself, the improvement consists in the application to husking-rolls.

In feeding the machine, the stalks are placed upon the table T, and fed butts first between D and E, where they are carried along and the ears pinched off, dropping them upon the incline C and between the rolls R R, where the husks are removed and the ears delivered at the lower end of said rollers R R.

What I claim as my invention is—

1. A pair of husking-rollers with a depression or depressions in the surface of one or both, formed substantially as set forth, and which alternately pull the husk and then let go of the same before the depressed portion of the roller impinges on the ear, substantially as set forth.

2. In combination with the rolls R R, constructed substantially as described, the double gears L L, as and for the purposes set forth.

3. The teeth P, introduced in the husking-roller R at the depressed portion of its surface, as and for the purposes set forth.

4. The knives or cutters M, applied to and combined with the husking-rollers R R, constructed as described, and for the purposes set forth.

5. The method of husking corn by means of rollers constructed and operating substantially as described, which pull upon and let go the husks alternately during their revolution, in the manner and for the purpose specified.

Signed by me this 24th day of January, A. D. 1871.

L. AUGS. ASPINWALL.

Witnesses:
GEO. D. WALKER,
CHAS. H. SMITH.